(12) United States Patent
Ishigure et al.

(10) Patent No.: US 9,470,243 B2
(45) Date of Patent: Oct. 18, 2016

(54) GUIDE VANE ATTACHMENT STRUCTURE AND FAN

(75) Inventors: Tadahiro Ishigure, Tokyo (JP); Yukihiro Kondo, Tokyo (JP); Takaomi Inada, Tokyo (JP)

(73) Assignee: IHI Corporation, Tokyo (JP)

( * ) Notice: Subject to any disclaimer, the term of this patent is extended or adjusted under 35 U.S.C. 154(b) by 619 days.

(21) Appl. No.: 13/979,054

(22) PCT Filed: Mar. 8, 2012

(86) PCT No.: PCT/JP2012/055976
§ 371 (c)(1),
(2), (4) Date: Jul. 10, 2013

(87) PCT Pub. No.: WO2012/121334
PCT Pub. Date: Sep. 13, 2012

(65) Prior Publication Data
US 2013/0287562 A1     Oct. 31, 2013

(30) Foreign Application Priority Data

Mar. 9, 2011 (JP) ................................. 2011-051817

(51) Int. Cl.
*F01D 25/24* (2006.01)
*F04D 29/54* (2006.01)
*F01D 5/28* (2006.01)
(Continued)

(52) U.S. Cl.
CPC ............... *F04D 29/54* (2013.01); *F01D 5/282* (2013.01); *F01D 9/042* (2013.01); *F01D 25/243* (2013.01); *F01D 25/246* (2013.01); *F02K 3/06* (2013.01); *F04D 29/542* (2013.01); *F04D 29/644* (2013.01); *F05D 2250/232* (2013.01); *F05D 2260/36* (2013.01); *Y02T 50/672* (2013.01)

(58) Field of Classification Search
CPC ........ F01D 9/042; F01D 5/282; F01D 9/041; F01D 5/147; F01D 25/24; F01D 25/243; Y02T 50/672; F05D 2300/603; F04D 29/54; F04D 29/542
See application file for complete search history.

(56) References Cited

U.S. PATENT DOCUMENTS 4,494,909 A     1/1985   Forestier
5,013,216 A *   5/1991   Bailey .................... D04C 1/06
                                                      29/889.71

(Continued)

FOREIGN PATENT DOCUMENTS

CA     2 746 284 A1     1/2012
EP     0 516 389 A2    12/1992

(Continued)

OTHER PUBLICATIONS

International Search Report Issued Jun. 12, 2012 in PCT/JP12/055976 Filed Mar. 8, 2012.

(Continued)

*Primary Examiner* — Richard Edgar
*Assistant Examiner* — Eldon Brockman
(74) *Attorney, Agent, or Firm* — Oblon, McClelland, Maier & Neustadt, L.L.P.

(57) ABSTRACT

A guide vane attachment structure including a first fitting portion formed in a vane joint surface of a guide vane, a support member whose constituent material is a metal is integrally connected to a fan frame, and a second fitting portion to be fitted to the first fitting portion formed in a support joint surface of the support member.

11 Claims, 8 Drawing Sheets

(51) Int. Cl.
  *F01D 9/04* (2006.01)
  *F02K 3/06* (2006.01)
  *F04D 29/64* (2006.01)

(56) References Cited

U.S. PATENT DOCUMENTS

| | | | | |
|---|---|---|---|---|
| 5,222,360 | A * | 6/1993 | Antuna | B64D 27/18 415/209.2 |
| 5,272,869 | A * | 12/1993 | Dawson | F01D 9/042 415/142 |
| 5,320,490 | A * | 6/1994 | Corbin | F01D 9/042 415/209.2 |
| 5,375,978 | A * | 12/1994 | Evans | B64C 11/26 416/224 |
| 6,261,058 | B1 | 7/2001 | Kataoka et al. | |
| 7,614,848 | B2 * | 11/2009 | Bogue | B23P 6/005 29/888.022 |
| 8,550,776 | B2 * | 10/2013 | McDonald | F01D 5/282 415/209.4 |
| 8,662,819 | B2 * | 3/2014 | Beaulieu | F01D 25/246 415/1 |
| 8,690,531 | B2 * | 4/2014 | Tudor | F01D 5/141 415/209.4 |
| 8,807,933 | B2 * | 8/2014 | Duchaine | B29C 53/587 29/889.22 |
| 2005/0158171 | A1 * | 7/2005 | Carper | B32B 18/00 415/200 |
| 2006/0245715 | A1 | 11/2006 | Matsumoto et al. | |
| 2007/0086854 | A1 | 4/2007 | Blanton | |
| 2008/0187441 | A1 * | 8/2008 | Schreiber | B29C 70/202 416/229 R |
| 2009/0252610 | A1 | 10/2009 | Wassynger et al. | |
| 2010/0150708 | A1 | 6/2010 | Cortequisse | |
| 2010/0196149 | A1 * | 8/2010 | Beaulieu | F01D 25/246 415/182.1 |
| 2011/0243752 | A1 * | 10/2011 | Duchaine | B29C 53/587 416/241 R |
| 2012/0171025 | A1 * | 7/2012 | Tudor | F01D 5/141 415/191 |

FOREIGN PATENT DOCUMENTS

| | | |
|---|---|---|
| EP | 1 548 233 A1 | 6/2005 |
| EP | 1 911 931 A2 | 4/2008 |
| EP | 2 149 711 A2 | 2/2010 |
| EP | 2 412 931 A2 | 2/2012 |
| GB | 802508 A | 10/1958 |
| JP | 52 77909 | 6/1977 |
| JP | 56 34006 | 4/1981 |
| JP | 58-150100 A | 9/1983 |
| JP | 62 45397 | 3/1987 |
| JP | 5-149148 | 6/1993 |
| JP | 5 149148 | 6/1993 |
| JP | 2766423 | 6/1998 |
| JP | 10 196308 | 7/1998 |
| JP | 2003 254298 | 9/2003 |
| JP | 2005 194903 | 7/2005 |
| JP | 2006 307698 | 11/2006 |
| JP | 2007 113573 | 5/2007 |
| JP | 2009 250237 | 10/2009 |
| RU | 40655 U1 | 9/2004 |
| WO | WO 2010/122053 A1 | 10/2010 |

OTHER PUBLICATIONS

Office Action issued Nov. 7, 2014 in Russian Patent Application No. 2013144741 (with English language translation).
Office Action issued Jan. 15, 2015 in Canadian Patent Application No. 2,824,281.
Office Action issued Dec. 10, 2015 in European Patent Application No. 12 754 999.6.
Decision on Grant issued Apr. 1, 2015 in Russian Patent Application No. 2013144741 (with English language translation).
Extended European Search Report issued Nov. 17, 2014 in Patent Application No. 12754999.6.
Office Action issued Aug. 26, 2014 in Japanese Patent Application No. 2013-503602 (with English language translation).

* cited by examiner

GUIDE VANE ATTACHMENT STRUCTURE AND FAN

TECHNICAL FIELD

The present invention relates to a guide vane attachment structure and the like configured to attach a guide vane, which is used for a fan of an aircraft engine and is configured to straighten the airflow, to a fan frame or a fan case.

BACKGROUND ART

A fan of an aircraft engine takes the air into: an annular core passage (a main passage) formed inside a barrel-shaped engine main body (an engine internal barrel); and a bypass passage formed between the outer peripheral surface of the engine main body and the inner peripheral surface of a barrel-shaped fan case placed outside the engine main body. A general configuration of the fan is as follows.

A fan disk is rotatably provided to the front portion of the engine main body. Multiple fan rotor blades are provided to the outer peripheral surface of the fan disk at equal intervals in the circumferential direction. In addition, multiple guide vanes are provided downstream of the fan rotor blades between the engine main body and the fan case at equal intervals in the circumferential direction. The multiple guide vanes straighten the flow of the air taken into the bypass passage.

In this respect, the multiple guide vanes may have a function as a structural body configured to integrally connect the fan case to a fan frame which is part of the engine main body in addition to the function of straightening the airflow, or may only have the function of straightening the airflow. In the former case, a metal such as an aluminum alloy is typically used as the constituent material of the guide vanes. In the latter case, a metal such as an aluminum alloy, or a composite material made of a thermosetting resin such as an epoxy resin and reinforcement fibers such as carbon fibers is typically used as the constituent material of the guide vanes. Moreover, the latter case uses multiple struts which are placed downstream of the guide vanes at intervals in the circumferential direction and whose constituent material is a metal such as an aluminum alloy, and makes the struts partially bear the function as the structural body.

It should be noted that the art disclosed by Patent Documents 1 to 3 is the background art related to the present invention.

CITATION LIST

Patent Literature

[PTL 1] U.S. Pat. No. 5,320,490
[PTL 2] JP 2766423 B2
[PTL 3] JP 05-149148 A

SUMMARY OF INVENTION

Technical Problem

In recent years, the fan diameter (the diameter of the fan) has tended to become larger because of a demand to increase the bypass ratio to improve the fuel efficiency of the aircraft engine. In response to this, it becomes imperative to advance a weight reduction of the fan, that is, a weight reduction of the aircraft engine. On the other hand, the weight of the fan, that is, the weight of the aircraft engine is heavier in the case, as described above, where a metal such as an aluminum alloy is the constituent material of the guide vanes than in the case where the light composite material is the constituent material of the guide vanes. Furthermore, even in the case where the constituent material of the guide vanes is a lightweight composition material, the weight reduction of the guide vanes themselves can be advanced but multiple struts using a metal such as an aluminum alloy as the constituent material are required. For this reason, it is not easy to sufficiently advance a weight reduction of the fan, that is, the weight reduction of the aircraft engine.

With this taken into consideration, an object of the present invention is to provide a guide vane attachment structure and the like with a novel configuration, which can sufficiently advance a weight reduction of an aircraft engine.

Solution to Problem

A first aspect of the present invention is a guide vane attachment structure configured to attach a guide vane to any one of a fan frame and a fan case of an aircraft engine, the guide vane being used for a fan of the aircraft engine, formed using as a constituent material a composite material made from a thermosetting resin or a thermoplastic resin and reinforcement fibers, and configured to straighten air, the fan case placed outside the fan frame, the guide vane attachment structure comprising: a vane joint surface formed at an end portion of the guide vane; a first fitting portion formed in the vane joint surface of the guide vane; a support member made of a metal as a constituent material thereof, the support member being integrally connected to the one of the fan frame and the fan case; a support joint surface to be joined to the vane joint surface of the guide vane, formed in the support member; and a second fitting portion to be fitted to the first fitting portion of the guide vane, formed in the support joint surface of the support member.

As the first fitting portion, a vane protruding portion protruding in a direction orthogonal to a radial direction may be formed in the vane joint surface. As the second fitting portion, a support recess portion set back in the orthogonal direction may be formed in the support joint surface.

The guide vane may have a layered structure in which members made from the composite material and each formed in a shape of a sheet are stacked. In this case, a protrusion forming member designed to form the vane protruding portion may be provided in one of interstices between the stacked sheet-shaped members made from the composite material.

The protrusion forming member may be a layered body in which a plurality of sheet-shaped members made from a composite material are stacked.

The protrusion forming member may be a block made from any one of a short-fiber-reinforced composite material and a three-dimensional fiber-reinforced composite material.

The protrusion forming member may include a plurality of mutually independent sheet-shaped members made from a composite material. In this case, the sheet-shaped members of the composite material constituting the protrusion forming member are provided in at least two of the interstices between the sheet-shaped members of the composite material constituting the layered structure.

As the first fitting portion, a vane recess portion set back in a direction orthogonal to a radial direction may be formed in the vane joint surface. As the second fitting portion, a support protruding portion protruding in the orthogonal direction may be formed in the support joint surface.

In the guide vane attachment structure, the support joint surface of the support member may be joined to the vane joint surface of the guide vane by fastening force between a bolt and a nut, and a transmission member configured to transmit the fastening force to the vane joint surface of the guide vane and the support joint surface of the support member is provided between a surface of the guide vane opposite from the vane joint surface and any one of the nut and a head of the bolt.

A second aspect of the present invention is a fan configured to take air into an annular core passage formed inside a barrel-shaped engine main body of an aircraft engine and into a bypass passage formed between an outer peripheral surface of the engine main body and an inner peripheral surface of a barrel-shaped fan case placed outside the engine main body, comprising the guide vane attachment structure of any one of claims 1 to 8.

Advantageous Effects of Invention

The present invention can provide the guide vane with the function as the structural body configured to integrally connect the fan frame and the fan case together in addition to the function of straightening the air even though the constituent material of the guide vane is the composite material, since the joint rigidity between the end portion of the guide vane and the fan frame or the fan case can be sufficiently secured against compressive load in the radial direction, tensile load in the radial direction and bending load in the orthogonal direction which occur during the operation of the aircraft engine. This makes it no longer necessary to use a metal as the constituent material of the guide vane, or to arrange the multiple struts, whose constituent material is a metal, downstream of the guide vane at intervals in the circumferential direction. This can sufficiently advance a weight reduction of the fan, in other words, a weight reduction of the aircraft engine.

DESCRIPTION OF EMBODIMENTS

[First Embodiment]
Descriptions will be provided for a first embodiment of the present invention by referring to FIG. 1 to FIG. 6. It should be noted that in the drawings, reference sign "FF" denotes a forward direction and reference sign "FR" denotes a rearward direction. Furthermore, the term "joint" in this application means the joining achieved by shrink fitting, bonding and the like in addition to the joining achieved by fastening force between a bolt and a nut. Moreover, the expression "to integrally connect" means to connect members together in such a way not to change relative positions between the connected members.

Figure 1:
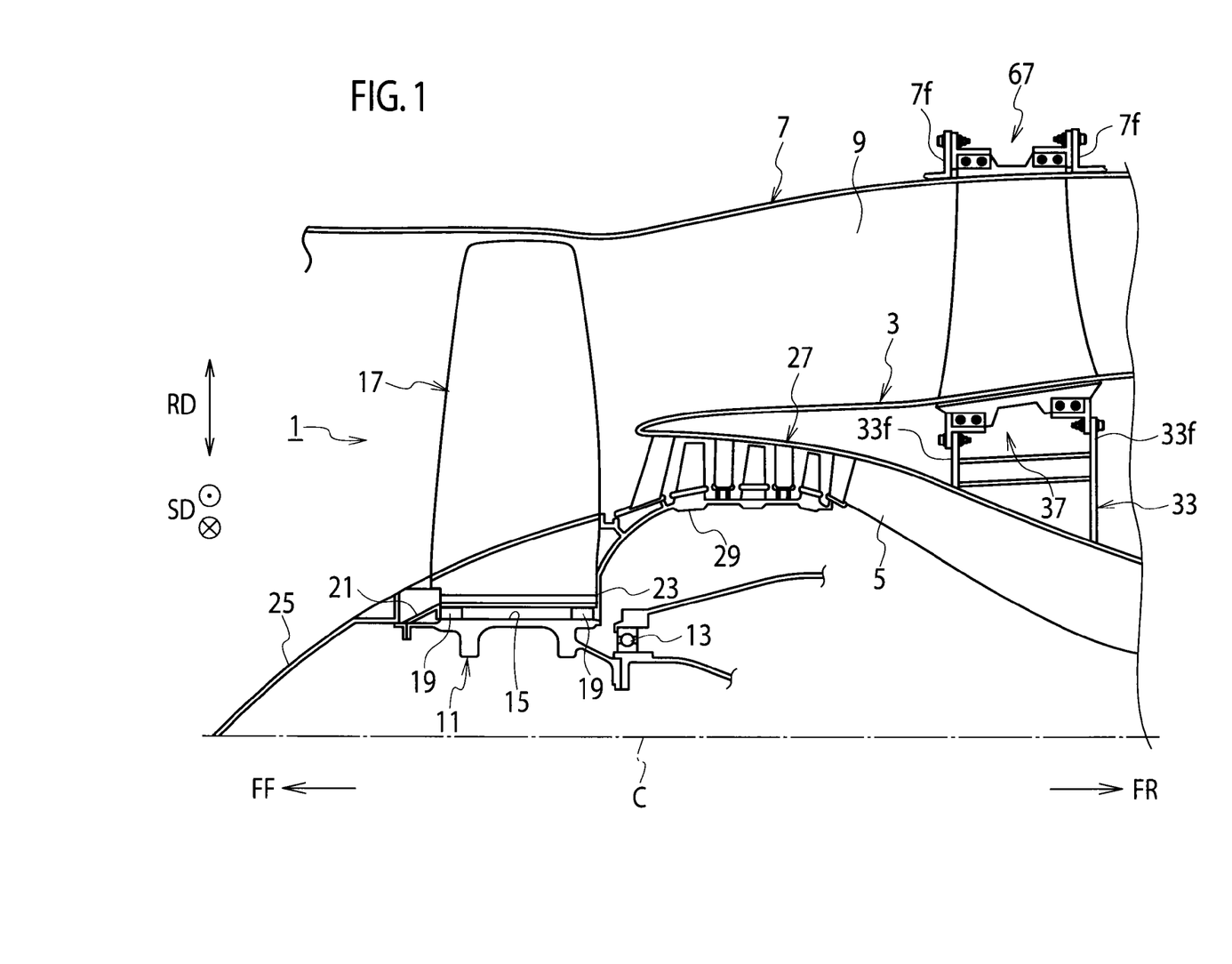
FIG. 1 is a cross-sectional view of a half of a front portion of an aircraft engine which includes a fan of a first embodiment of the present invention.

As shown in FIG. 1, a fan 1 of the first embodiment of the present invention is designed to take air into an annular core passage 5 formed inside a barrel-shaped engine main body (an engine internal barrel) 3 of an aircraft engine, and a bypass passage 9 formed between the inner peripheral surface of a barrel-shaped fan case 7 placed outside the engine main body 3 and the outer peripheral surface of the engine main body 3. The configuration and the like of the fan 1 of the first embodiment of the present invention are described as follows.

A fan disk 11 is provided at a front portion of the engine main body 3 with a bearing 13 interposed in between in such a way as to be rotatable around the engine axial center (the axial center of the fan 1) C. The fan disk 11 is coaxially integrally connected to multi-stage low-pressure turbine rotors (whose illustration is omitted) of a low-pressure turbine (whose illustration is omitted) placed in the rear of the fan 1. In addition, multiple fitting grooves (fitting cuts) 15 are formed in the outer peripheral surface of the fan disk 11 at equal intervals in the circumferential direction.

Fan rotor blades 17 are fitted to the respective fitting grooves 15 of the fan disk 11. In other words, the multiple fan rotor blades 17 are provided on the outer peripheral surface of the fan disk 11 by use of the respective fitting grooves 15 at equal intervals in the circumferential direction. In addition, multiple spacers 19 are provided at front and rear portions in the interstices between the bottom surfaces (deep surfaces) of the fitting grooves 15 of the fan disk 11 and the fan rotor blades 17, respectively. An annular front retainer 21 for retaining the multiple fan rotor blades 17 from the front is integrally provided to the front portion of the fan disk 11, while an annular rear retainer 23 for retaining the multiple fan rotor blades 17 from the rear is integrally provided to the rear portion of the fan disk 11. Incidentally, the front retainer 21 is integrally connected to a nose cone 25 for guiding the air, while the rear retainer 23 is coaxially integrally connected to a low-pressure compressor rotor 29 of a low-pressure compressor 27 placed in the rear of the fan 1.

For this reason, the operation of the aircraft engine rotates the fan disk 11, which thus rotates the multiple fan rotor blades 17 integrally with the fan disk 11. This enables the air to be taken into the core passage 5 and the bypass passage 9.

Multiple guide vanes 31 are provided downstream of the fan rotor blades 17 in the interstice between the engine main body 3 and the fan case 7, and at equal intervals in the circumferential direction. The multiple guide vanes 31 are those which straighten the flow of the air taken into the bypass passage 9 (in other words, the air whirled by the multiple fan rotor blades 17). A composite material made from a thermosetting resin or a thermoplastic resin and reinforcement fibers is used as the constituent material of each guide vane 31. Examples of the thermosetting resin include an epoxy resin, a phenol resin and a polyimide resin. Examples of the thermoplastic resin include polyether imide, polyether etherketone and polyphenylene sulfide. Examples of the reinforcement fibers include carbon fibers, aramid fibers and glass fibers. Each guide vane 31, for example, has a structure (a multilayered structure) in which the composite materials formed in the shape of a sheet are stacked in a thickness direction (the thickness direction of the guide vane 31), or a three-dimensional fabric structure. Moreover, an inner end portion (a base portion) of each guide vane 31 in the radial direction is integrally connected to a pair of attachment flanges 33f of a barrel-shaped fan frame 33 which constitutes part of the engine main body 3. An outer end portion (a tip portion) of each guide vane 31 in the radial direction is integrally connected to a pair of attachment flanges 7f of the fan case 7. A platform 35 is placed between the inner end portions (the base portions) in the radial direction of each two neighboring guide vanes 31.

Descriptions will be subsequently provided for a guide vane attachment structure 37 configured to attach the guide vanes 31 (the inner end portions of the guide vanes 31 in the radial direction) to the fan frame 33.

Figure 2:
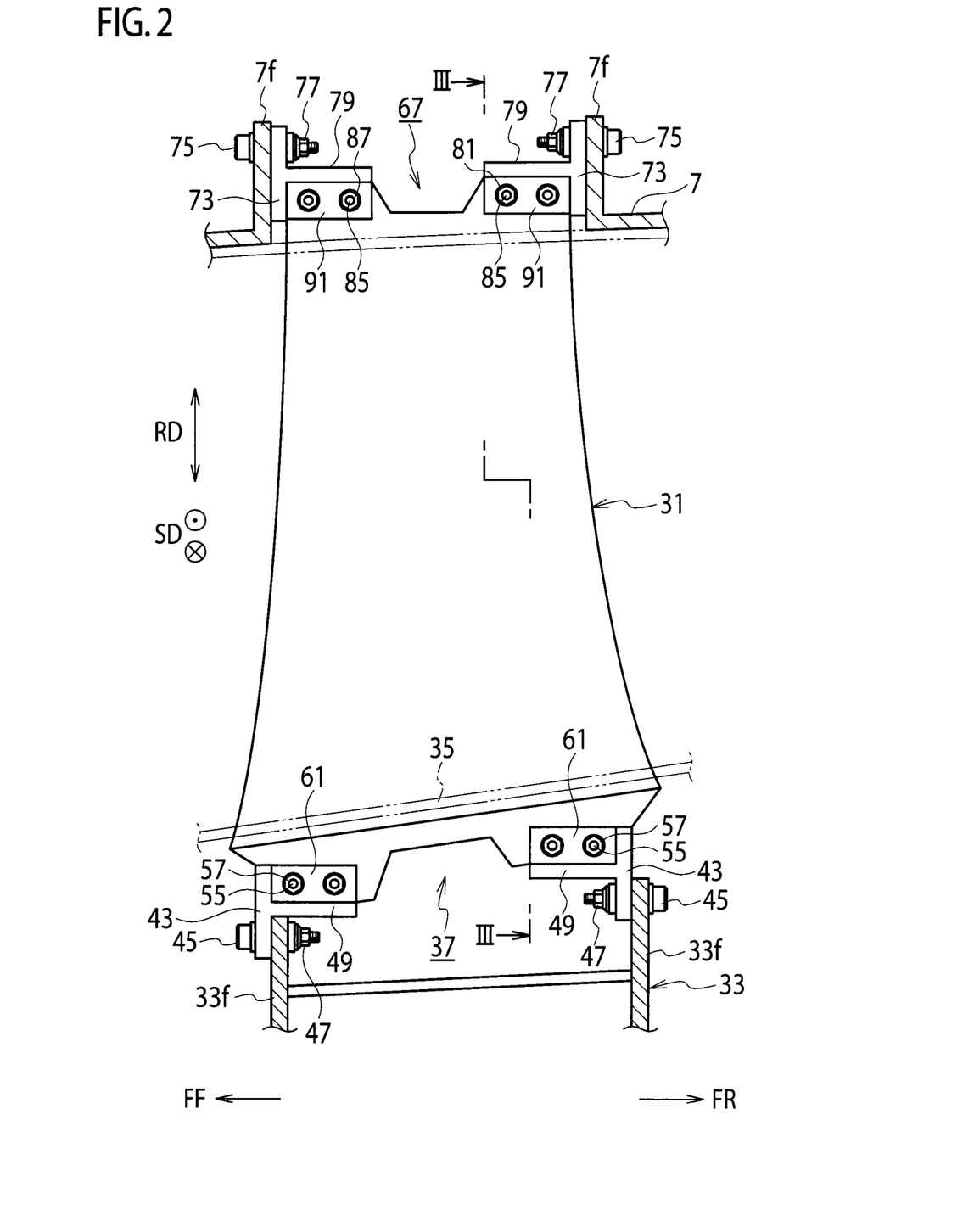
FIG. 2 is a diagram showing a guide vane attachment structure of the first embodiment of the present invention.
Figure 3:
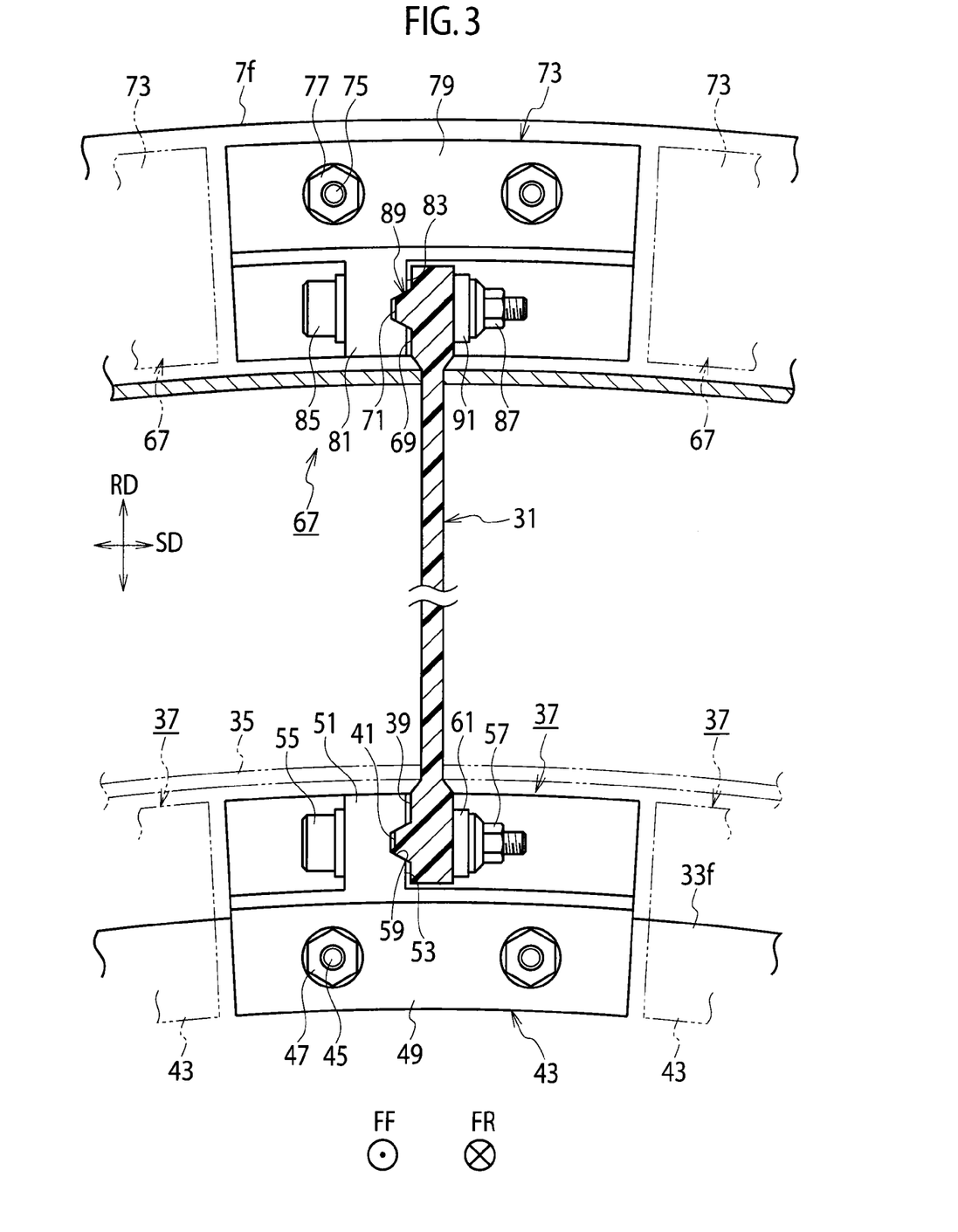
FIG. 3 is a cross-sectional view of the guide vane attachment structure taken along the III-III line of FIG. 2.

As shown in FIG. 2 and FIG. 3, a vane joint surface 39 parallel to the radial direction (the radial direction of the fan 1) RD is formed in each of the front and rear portions of the inner end portion of each guide vane 31 in the radial direction. In addition, as a first fitting portion, a vane protruding portion 41 protruding in a direction SD orthogonal to the radial direction RD and shaped like a trapezoid in a side view is formed in each vane joint surface 39 of the guide vane 31. As described later, the vane protruding portion 41 is fitted into a support recess portion 59 as a second fitting portion formed in a support member 43. For example, the vane protruding portion 41 and the support recess portion 59 wedge-engage with each other.

Figure 4:
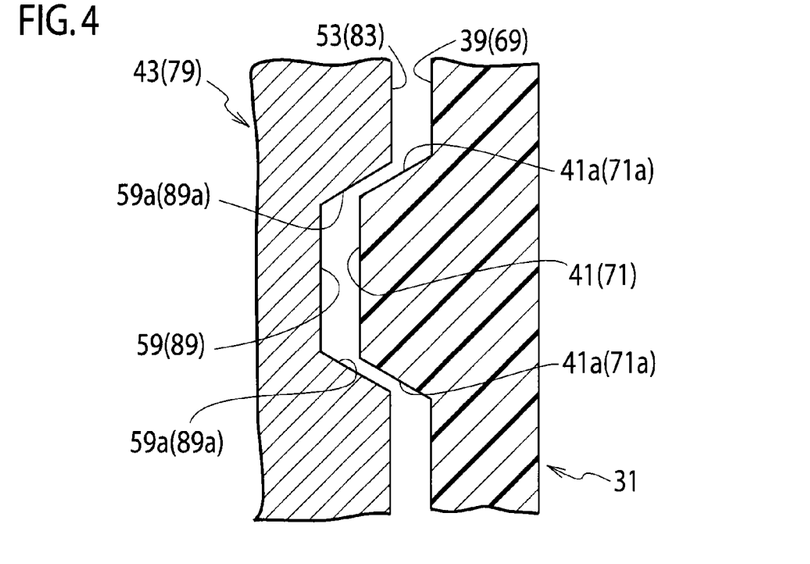
FIG. 4 is a cross-sectional view showing a vane protruding portion and a support recess portion of the first and second embodiments of the present invention.
Figure 5:
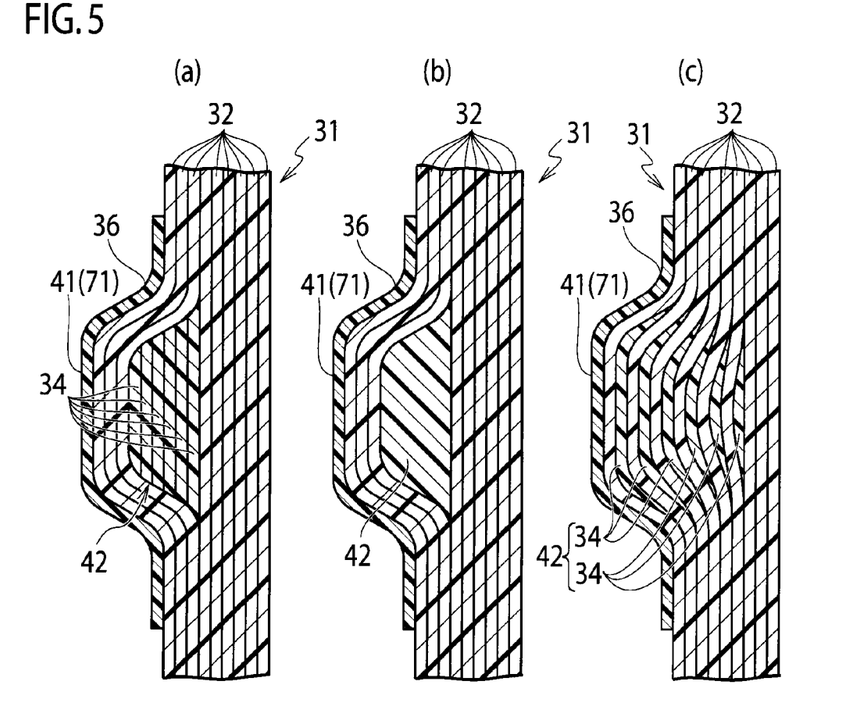
FIGS. 5(a) to 5(c) are cross-sectional views of the vane protruding portion of the first and second embodiments, which show examples of the vane protruding portion.

FIG. 4 is a cross-sectional view showing the vane protruding portion 41 (or a vane protruding portion 71 to be described later) and the support recess portion 59 (or a support recess portion 89 to be described later), and shows a state in which the vane protruding portion 41 has not been fitted into the support recess portion 59 yet (or the vane protruding portion 71 has not been fitted into the support recess portion 89 yet). As shown FIG. 4, the vane protruding portion 41 is shaped like a wedge, for example. As side surfaces of the vane protruding portion 41, tapered surfaces (inclined surfaces) 41a, 41a which are formed with their interval becoming gradually smaller toward the support recess portion 59 are included in the vane protruding portion 41. When the vane protruding portion 41 is fitted into the support recess portion 59, the tapered surfaces 41a, 41a come into contact with flare surfaces 59a, 59a of the support recess portion 59, and thus restrict the position of the guide vane 31 relative to the support member 43.

FIGS. 5(a) to 5(c) are cross-sectional views of the vane protruding portion 41 when the guide vane 31 has a layered structure of the composite materials 32 each formed in the shape of a sheet (hereinafter each referred to as a composite material sheet.) As described above, the guide vane 31 may be formed by stacking the aforementioned multiple composite material sheets. In this case, any one of protrusion forming members 42 shown in FIGS. 5(a) to 5(c) is provided at a portion in which the vane protruding portion 41 of the guide vane 31 is to be formed. Consequently, a protrusion as the vane protruding portion 41 is formed. The protrusion forming member 42 is provided in at least one of the gaps between the stacked composite material sheets 32. For example, as shown in FIG. 5(a) and FIG. 5(b), the protrusion forming member 42 may be provided in at least one of the gaps. Otherwise, as shown in FIG. 5(c), composite material sheets 34 collectively serving as the protrusion forming member 42 may be provided in at least two of the gaps each between the adjacent composite material sheets 32, 32.

The protrusion forming member 42 shown in FIG. 5(a) is a layered body obtained by stacking the composite material sheets 34. Of the prepregs of the composite material sheets 32 collectively forming the guide vane 31, a predetermined number of the prepregs are first stacked and then the prepregs of the composite material sheets 34 constituting the layered body are stacked. Subsequently, the remaining prepregs of the composite material sheets 32 are stacked. Then, the resultant product is subjected to hot pressure forming. Thereby, the guide vane 31 and vane protruding portion 41 are formed simultaneously. It should be noted that when the vane protruding portion 41 (the guide vane 31) is formed, a pad layer 36 may be provided on the top (outermost) composite material sheet 32 which faces the support recess portion 59. Depending on the necessity, the pad layer 36 is polished and cut for the purpose of compensating for dimensional variation of the vane protruding portion 41 which occurs due to thermal contraction of the composite material sheets 32 after their formation. In a case where, however, a mold made with the thermal contraction taken into consideration is used, the pad layer 36 does not have to be provided because the use of such a mold makes the dimensional variation negligible. In addition, the layered body made from the composite material sheets 34 may be formed in the shape of a block before stacking the prepregs of the composite material sheets 32. In this case, this layered body is placed after stacking the prepregs in the predetermined number of the composite material sheets 32. Thereafter, the rest of the prepregs of the composite material sheets 32 are stacked and then the resultant product is subjected to the hot pressure forming.

As apparent from the above-described manufacturing processes, there is no fibrous boding between the reinforcement fibers of the composite material sheets 34 and the reinforcement fibers of the composite material sheets 32, and the composite material sheets 32 define the overall shape of the guide vane 31 with none of their inner reinforcement fibers being cut off. For this reason, the mechanical strength of the guide vane 31 does not deteriorate due to formation of the vane protruding portion 41. It should be noted that the composite material sheets 34 may be made from the same material as that of the composite material sheets 32 or from a material different from that of the composite material sheets 32.

The protrusion forming member 42 shown in FIG. 5(b) is a block (a lump) made from a short-fiber-reinforced composite material or a three-dimensional fiber-reinforced composite material. In other words, the single block is provided instead of the layered body made of the composite material sheets 34 shown in FIG. 5(a). In this case, this block is placed after prepregs in a predetermined number of the composite material sheets 32, as in the case shown in FIG. 5(a). Thereafter, the rest of the prepregs of the composite material sheets 32 are stacked and then the result product is subjected to hot pressure forming. Thereby, the guide vane 31 and the vane protruding portion 41 are formed simultaneously. In the case shown in FIG. 5(b) as well, the composite material sheets 32 define the overall shape of the guide vane 31 with none of their inner reinforcement fibers being cut off. For this reason, the mechanical strength of the guide vane 31 does not deteriorate due to formation of the vane protruding portion 41. Here, the pad layer 36 may be placed in a similar manner to that in the case shown in FIG. 5(a), and relevant descriptions will therefore be omitted.

The protrusion forming member 42 shown in FIG. 5(c) is formed by the multiple composite material sheets 34 provided respectively in at least two of the gaps between the adjacent composite material sheets 32, 32. Each adjacent two of the composite material sheets 34 are provided independently of each other (or individually) in such a manner as to interpose one composite material sheet 32 in between. The composite material sheets 34 as a whole form the protrusion as the vane protruding portion 41. The vane protruding portion 41 and the guide vane 31 are formed simultaneously by stacking the prepregs of the composite material sheet 32 and the prepregs of the composite material sheets 34 alternately, and subjecting the resultant product to hot pressure forming. In the case shown in FIG. 5(c) as well, the composite material sheets 32 define the overall shape of the guide vane 31 with none of their inner reinforcement fibers being cut off. For this reason, the mechanical strength of the guide vane 31 does not deteriorate due to formation of the vane protruding portion 41. Here, the pad layer 36 may be placed in a similar manner to that in the case shown in FIG. 5(a), and relevant descriptions will therefore be omitted.

The support member 43 whose constituent material is a metal such as an aluminum alloy or a titanium alloy is integrally connected to each attachment flange 33f of the fan frame 33 by fastening force between bolts 45 and nuts 47. Each support member 43 is formed from a support member main body 49 shaped like the letter T in the side view, and a joint block 51 formed integrally with the support member main body 49. In addition, a support joint surface 53 parallel to the radial direction RD is formed in the joint block 51 of each support member 43. The support joint surface 53 of each support member 43 is joined to the corresponding vane joint surface 39 of the guide vane 31 by fastening force between bolts 55 and nuts 57.

As the second fitting portion to be fitted to the first fitting portion, the support recess portion 59 set back in the orthogonal direction SD and shaped like a trapezoid in the side view is formed in the support joint surface 53 of each support member 43. As shown in FIG. 4, as the side surfaces of the support recess portion 59 of each support member 43, the flare surfaces (inclined surfaces) 59a, 59a which are formed with their interval becoming gradually larger towards the vane protruding portion 41 are included in the support recess portion 59. Thus, the support recess portion 59 is fitted to the corresponding vane protruding portion 41 of the guide vane 31. In other words, the support recess portion 59 and the vane protruding portion 41 wedge-engage with each other. The inclination angles of the tapered surfaces 41a, 41a and the flare surfaces 59a, 59a with respect to a direction of engagement thereof are equal to one another for the purpose of achieving the fitting. It should be noted that although the front support member and the rear support member 43 are those which are independent of each other in the front-rear direction, the front support member 43 and the rear support member 43 may be formed as a single member instead.

A transmission member 61 whose constituent material is a metal such as an aluminum alloy or a titanium alloy is provided between a surface of the guide vane 31 on the opposite side of each vane joint surface 39 and the nuts 47. Each transmission member 61 is configured to transmit the fastening force between the bolts 45 and the nuts 47 to the vane joint surface of the guide vane 31 and the support joint surface 53 of the support member 43. The transmission member 61 has a sufficiently rigid structure for the purpose of appropriately transmitting the fastening force. This structure is formed by using a thick flat plate (a flat bar) or a web, for example. It should be noted that like the support member 43, the transmission member 61 may be integrally connected to the attachment flange 33f of the fan frame 33.

Figure 6:
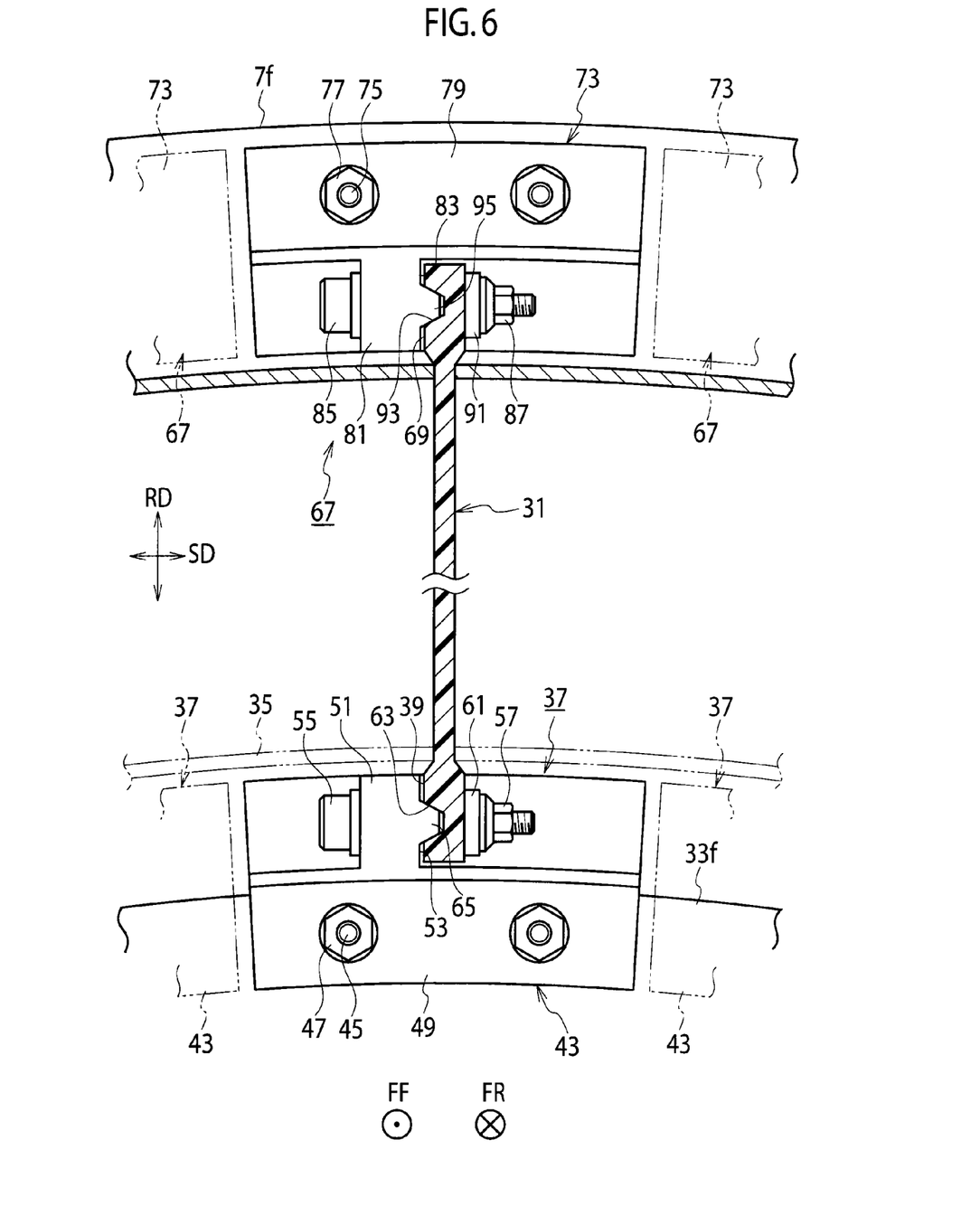
FIG. 6 a diagram showing another mode of the guide vane attachment structure of the first embodiment of the present invention, which corresponds to FIG. 3.

In this respect, as shown in FIG. 6, a configuration may be employed in which: as a first fitting portion, a vane recess portion 63 set back in the orthogonal direction SD and shaped like a trapezoid in the side view is formed in each vane joint surface 39 of the guide vane 31; and as a second fitting portion, a support protruding portion 65 protruding in the orthogonal direction SD and fitted into (or wedge-engaging with) the vane recess portion 63 is formed in the support joint surface 53 of each support member 43, instead of the configuration in which: the vane protruding portion 41 protruding in the orthogonal direction SD and shaped like a trapezoid in the side view is formed in each vane joint surface 39 of the guide vane 31; and the support recess portion 59 set back in the orthogonal direction SD is formed in the support joint surface 53 of each support member 43. In addition, the vane protruding portion 41 or the vane recess portion 63 of the guide vane 31 and the support recess portion 59 or the support protruding portion 65 of the support member 43 may be shaped like a triangle in the side view instead of being shaped like a trapezoid in the side view.

Descriptions will be subsequently provided for a guide vane attachment structure 67 configured to attach the guide vane 31 (the outer end portion of the guide vane 31 in the radial direction) to the fan case 7. As shown in FIG. 1, the fan case 7 is placed outside the engine main body 3 (the fan frame 33), and defines the bypass passage 9 for making the discharged air from the fan 1 flow between the fan case 7 and the engine main body 3.

As shown in FIG. 2 and FIG. 3, a vane joint surface 69 parallel to the radial direction RD is formed in each of the front and rear portions of the outer end portion of each guide vane 31 in the radial direction. In addition, as the first fitting portion, a vane protruding portion 71 protruding in the direction SD orthogonal to the radial direction RD and shaped like a trapezoid in a side view is formed in each vane joint surface 69 of the guide vane 31.

As shown FIG. 4, the vane protruding portion 71 is shaped like a wedge, for example. As side surfaces of the vane protruding portion 71, tapered surfaces (inclined surfaces) 71a, 71a which are formed with their interval becoming gradually smaller toward a support recess portion 89 are included in the vane protruding portion 71. When the vane protruding portion 71 is fitted into the support recess portion 89, the tapered surfaces 71a, 71a come into contact with flare surfaces 89a, 89a of the support recess portion 89, and thus restrict the position of the guide vane 31 relative to a support member 73.

In the case where the guide vane 31 is formed by stacking the multiple composite material sheets 32, the vane protruding portion 71 is formed by the same method as that applied to the vane protruding portion 41. In other words, a protrusion as the vane protruding portion 71 is formed at a portion where the vane protruding portion 71 of the guide vane 31 is to be formed by providing any one of the protrusion forming members 42 shown in FIGS. 5(a) to 5(b). The pad layer 36 may be provided on the vane protruding portion 71 as well. In this respect, descriptions for a specific method of forming the vane protruding portion 71 and an effect thereof will be omitted because the method and effect are the same as those of the vane protruding portion 41.

The support member 73 whose constituent material is a metal such as an aluminum alloy or a titanium alloy is integrally connected to each attachment flange 7f of the fan case 7 by fastening force between bolts 75 and nuts 77. Each support member 73 is formed from a support member main body 79 shaped like the letter T in the side view, and a joint block 81 formed integrally with the support member main body 79. In addition, a support joint surface 83 parallel to the radial direction RD is formed in the joint block 81 of each support member 73. The support joint surface 83 of each support member 73 is joined to the corresponding vane joint surface 69 of the guide vane 31 by fastening force between bolts 85 and nuts 87.

A support recess portion 89 set back in the orthogonal direction SD and shaped like a trapezoid in the side view is formed in the support joint surface 83 of each support member 73. As shown in FIG. 4, the support recess portion of each support member 73 includes flare surfaces (inclined surfaces) 89a, 89a which are formed with their interval becoming gradually larger towards the vane protruding portion 71. Thus, the support recess portion 89 is fitted to the corresponding vane protruding portion 71 of the guide vane 31. In other words, the support recess portion 89 and the vane protruding portion 71 wedge-engage with each other. The inclination angles of the tapered surfaces 71a, 71a and the flare surfaces 89a, 89a with respect to a direction of engagement thereof are equal to one another for the purpose of achieving the fitting. It should be noted that although the front support member 73 and the rear support member 73 are those which are independent of each other in the front-rear direction, the front support member 73 and the rear support member 73 may be formed as a single member instead.

A transmission member 91 whose constituent material is a metal such as an aluminum alloy or a titanium alloy is provided between a surface of the guide vane 31 on the opposite side of each vane joint surface 69 and the nuts 87. Each transmission member 91 is configured to transmit the fastening force between the bolts 85 and the nuts 87 to the vane joint surface 69 of the guide vane 31 and the support joint surface 83 of the support member 73. The transmission member 91 has a sufficiently rigid structure for the purpose of appropriately transmitting the fastening force. This structure is formed by using a thick flat plate (a flat bar) or a web, for example. It should be noted that like the support member 73, the transmission member 91 may be integrally connected to the attachment flange 7f of the fan case 7.

In this respect, as shown in FIG. 6, a configuration may be employed in which: as the first fitting portion, a vane recess portion 93 setback in the orthogonal direction SD and shaped like a trapezoid in the side view is formed in each vane joint surface 69 of the guide vane 31; and as the second fitting portion, a support protruding portion 95 protruding in the orthogonal direction SD and fitted into (or wedge-engaging with) the vane recess portion 93 is formed in the support joint surface 83 of each support member 73, instead of the configuration in which: the vane protruding portion 71 protruding in the orthogonal direction SD and shaped like a trapezoid in the side view is formed in each vane joint surface 69 of the guide vane 31; and the support recess portion 89 set back in the orthogonal direction SD is formed in the support joint surface 83 of each support member 73. In addition, the vane protruding portion 71 or the vane recess portion 93 of the guide vane 31 and the support recess portion 89 or the support protruding portion 95 of the support member 73 may be shaped like a triangle in the side view instead of being shaped like a trapezoid in the side view.

Subsequently, descriptions will be provided for the working and effect of the first embodiment of the present invention.

The guide vane 31 (the inner end portion of the guide vane 31 in the radial direction) can be attached to the fan frame 33 while exerting an wedge effect produced by the vane protruding portion 41 of the guide vane 31 and the support recess portion 59 of the support member 43 (or by the vane recess portion 63 of the guide vane 31 and the support protruding portion 65 of the support member 43), since: the vane protruding portion 41 (or the vane recess portion 63) is formed in the vane joint surface 39 of the guide vane 31; the support member 43 whose constituent material is a metal such as an aluminum alloy is integrally connected to each attachment flange 33f of the fan frame 33; and the support recess portion 59 (or the support protruding portion 65) to be fitted to the vane protruding portion 41 (or the vane recess portion 63) of the guide vane 31 is formed in each support joint surface 53 of the support member 43. This makes it possible to sufficiently secure the joint rigidity (joint strength) between the inner end portion of the guide vane 31 in the radial direction and the fan frame 33 against a compressive load in the radial direction RD, a tensile load in the radial direction RD, and a bending load in the orthogonal direction SD which occur during the operation of the aircraft engine.

Similarly, the guide vane 31 (the outer end portion of the guide vane 31 in the radial direction) can be attached to the fan case 7 while exerting the wedge effect produced by the vane protruding portion 71 of the guide vane 31 and the support recess portion 89 of support member 73 (or by the vane recess portion 93 of the guide vane 31 and the support protruding portion 95 of the support member 73), since: the vane protruding portion 71 (or the vane recess portion 93) is formed in the vane joint surface 69 of the guide vane 31; the support member 73 whose constituent material is a metal such as an aluminum alloy is integrally connected to each attachment flange 7f of the fan case 7; and the support recess portion 89 (or the support protruding portion 95) to be fitted to the vane protruding portion 71 (or the vane recess portion 93) of the guide vane 31 is formed in each support joint surface 83 of the support member 73. This makes it possible to sufficiently secure the joint rigidity (joint strength) between the outer end portion of the guide vane 31 in the radial direction and the fan case 7 against a compressive load in the radial direction RD, a tensile load in the radial direction RD, and a bending load in the orthogonal direction SD which occur during the operation of the aircraft engine.

Accordingly, the first embodiment of the present invention enables the guide vane 31 to have the function as the structural body configured to integrally connect the fan frame 33 and the fan case 7 together in addition to the function of straightening the air even though the constituent material of the guide vane 31 is the composite material, since the joint rigidity between the inner end portion of the guide vane 31 in the radial direction and the fan frame 33, as well as the joint rigidity between the outer end portion of the guide vane 31 in the radial direction and the fan case 7, can be sufficiently secured against the compressive load in the radial direction RD, the tensile load in the radial direction RD, and the bending load in the orthogonal direction SD which occur during the operation of the aircraft engine. This makes it no longer necessary to use a metal such as an aluminum alloy as the constituent material of the guide vane 31, or to arrange multiple struts whose constituent material is a metal such as an aluminum alloy downstream of the guide vane 31 while providing intervals in the circumferential direction. This can sufficiently advance a weight reduction of the fan 1, in other words, a weight reduction of the aircraft engine.

[Second Embodiment]

Figure 7:
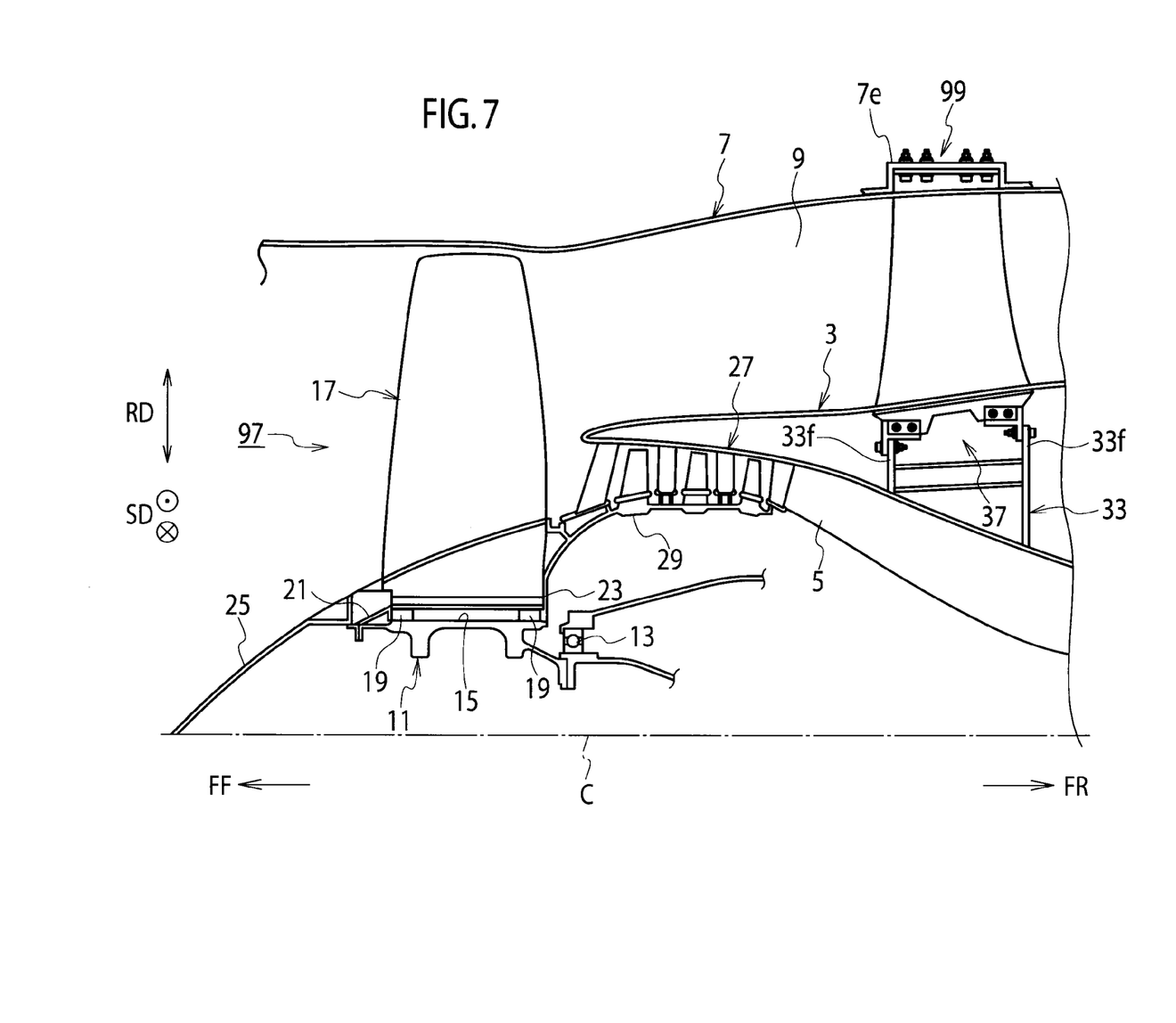
FIG. 7 is a cross-sectional view of a half of a front portion of an aircraft engine which includes a fan of a second embodiment of the present invention.
Figure 8:
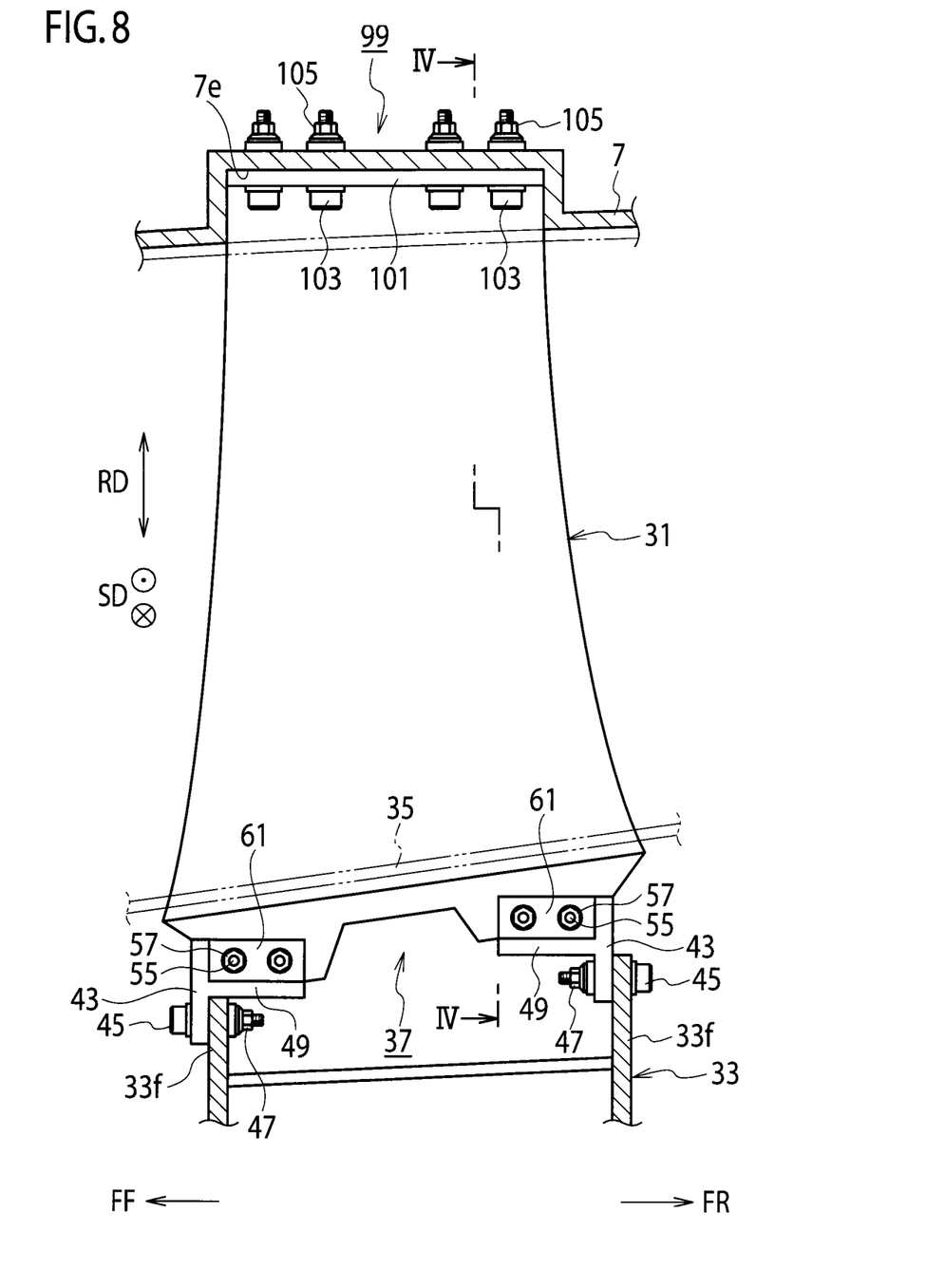
FIG. 8 is a diagram showing a guide vane attachment structure of the second embodiment of the present invention.
Figure 9:
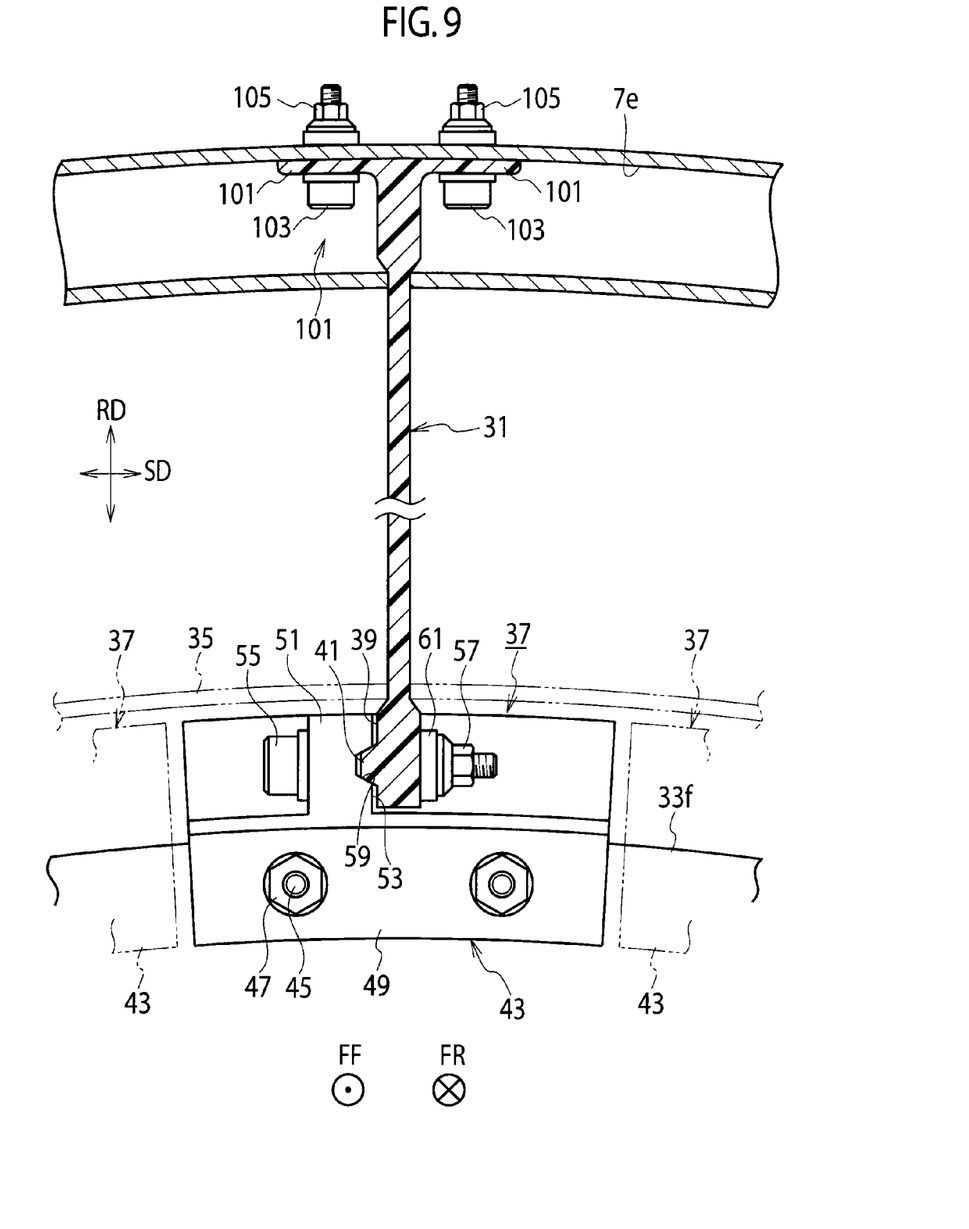
FIG. 9 is a cross-sectional view of the guide vane attachment structure taken along the IV-IV line of FIG. 8.

Descriptions will be provided for a second embodiment of the present invention by referring to FIG. 7 to FIG. 9. In the drawings, reference sign "FF" denotes the forward direction and reference sign "FR" denotes the rearward direction.

As shown in FIG. 7 to FIG. 9, a fan 97 of the second embodiment of the present invention is designed to take air into an annular core passage 5 and a bypass passage 9 of an aircraft engine. The fan 97 includes the same components as those of the fan 1 in the first embodiment of the present invention, except that the fan 97 has a guide vane attachment structure 99 whose configuration is different from that of the guide vane attachment structure 67 (see FIG. 1 to FIG. 4) of the fan 1 of the first embodiment of the present invention. Here, among the multiple components of the fan 97 of the second embodiment of the present invention, the components corresponding to those of the fan 1 of the first embodiment of the present invention will be denoted by the same reference numerals in the drawings.

The guide vane attachment structure 99 is used when no large load (none of the compressive load in the radial direction, the tensile load in the radial direction, and the bending load in the orthogonal direction SD) acts on a guide vane 31 and a fan case 7. To put it specifically, a pair of connection pieces 101 are formed at the outer end portion of the guide vane 31 in a way that the outer end portion is bifurcated into the pair of connection pieces 101. Each connection piece 101 of the guide vane 31 is connected to an expanded-diameter portion 7e of the fan case 7 by fastening force between bolts 103 and nuts 105.

The second embodiment of the present invention also brings about the same working and effects as those of the first embodiment of the present invention.

It should be noted that the present invention is not limited to what has been described with regard to the above embodiments, and that the present invention can be carried out in various modes. In addition, the scope of rights covered by the present invention is not limited to the embodiments.

INDUSTRIAL APPLICABILITY

The present invention can sufficiently advance a weight reduction of a fan, in other words, a weight reduction of an aircraft engine.

REFERENCE SIGNS LIST

1 fan
3 engine main body
5 core passage
7 fan case
7f attachment flange
9 bypass passage
11 fan disk
17 fan rotor blade
31 guide vane
33 fan frame
33f attachment flange
37, 67 guide vane attachment structure
39, 69 vane joint surface
41, 71 vane protruding portion (first fitting portion)

43, 73 support member
53, 83 support joint surface
59, 89 support recess portion (second fitting portion)
61, 91 transmission member
63, 93 vane recess portion (first fitting portion)
65, 95 support protruding portion (second fitting portion)

The invention claimed is:

1. A guide vane attachment structure configured to attach a guide vane to any one of a fan frame and a fan case of an aircraft engine, the guide vane being used for a fan of the aircraft engine, formed using as a constituent material a composite material made from a thermosetting resin or a thermoplastic resin and reinforcement fibers, and configured to straighten air, the fan case placed outside the fan frame, the guide vane attachment structure comprising:

a vane joint surface formed at an end portion of the guide vane;

a first fitting portion formed in the vane joint surface of the guide vane;

a support member made of a metal as a constituent material thereof, the support member being integrally connected to the one of the fan frame and the fan case;

a support joint surface to be joined to the vane joint surface of the guide vane, formed in the support member; and a second fitting portion configured to wedge-engage in a circumferential direction orthogonal to a radial direction with the first fitting portion of the guide vane, formed in the support joint surface of the support member.

2. The guide vane attachment structure of claim 1, wherein as the first fitting portion, a vane protruding portion protruding in the circumferential direction is formed in the vane joint surface, and as the second fitting portion, a support recess portion set back in the circumferential direction is formed in the support joint surface.

3. The guide vane attachment structure of claim 2, wherein the guide vane has a layered structure in which members made from the composite material and each formed in a shape of a sheet are stacked, and a protrusion forming member designed to form the vane protruding portion is provided in one of interstices between the stacked sheet-shaped members made from the composite material.

4. The guide vane attachment structure of claim 3, wherein the protrusion forming member is a layered body in which a plurality of sheet-shaped members made from a composite material are stacked.

5. The guide vane attachment structure of claim 3, wherein the protrusion forming member is a block made from any one of a short-fiber-reinforced composite material and a three-dimensional fiber-reinforced composite material.

6. The guide vane attachment structure of claim 3, wherein the protrusion forming member includes a plurality of mutually independent sheet-shaped members made from a composite material, and the sheet-shaped members of the composite material constituting the protrusion forming member are provided in at least two of the interstices between the sheet-shaped members of the composite material constituting the layered structure.

7. The guide vane attachment structure of claim 1, wherein
- as the first fitting portion, a vane recess portion set back in the circumferential direction is formed in the vane joint surface, and
- as the second fitting portion, a support protruding portion protruding in the circumferential direction is formed in the support joint surface.

8. The guide vane attachment structure of claim 1, wherein
- the support joint surface of the support member is joined to the vane joint surface of the guide vane by fastening force between a bolt and a nut, and
- a transmission member configured to transmit the fastening force to the vane joint surface of the guide vane and the support joint surface of the support member is provided between a surface of the guide vane opposite from the vane joint surface and any one of the nut and a head of the bolt.

9. A fan configured to take air into an annular core passage formed inside a barrel-shaped engine main body of an aircraft engine and into a bypass passage formed between an outer peripheral surface of the engine main body and an inner peripheral surface of a barrel-shaped fan case placed outside the engine main body, comprising:
- the guide vane attachment structure of claim 1.

10. The guide vane assembly of claim 1, wherein
- the first fitting portion and the second fitting portion extend in forward and rearward directions.

11. The guide vane assembly of claim 1, wherein
- inclined surfaces of the first fitting portion are configured to abut inclined surfaces of the second fitting portion such that the second fitting portion wedge-engages with the first fitting portion in the circumferential direction.

* * * * *